(12) United States Patent
Sogard

(10) Patent No.: US 10,466,045 B2
(45) Date of Patent: Nov. 5, 2019

(54) FLUID GAUGES COMPRISING MULTIPLE DIFFERENTIAL PRESSURE SENSORS

(71) Applicant: Nikon Corporation, Chiyoda-ku (JP)

(72) Inventor: Michael Sogard, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 1023 days.

(21) Appl. No.: 13/753,754

(22) Filed: Jan. 30, 2013

(65) Prior Publication Data

US 2013/0211777 A1 Aug. 15, 2013

Related U.S. Application Data

(60) Provisional application No. 61/592,924, filed on Jan. 31, 2012.

(51) Int. Cl.
*G01B 13/12* (2006.01)

(52) U.S. Cl.
CPC .................. *G01B 13/12* (2013.01)

(58) Field of Classification Search
None
See application file for complete search history.

(56) References Cited

U.S. PATENT DOCUMENTS

| 2,943,637 | A | * | 7/1960 | Eichenauer | B60S 5/043 |
| | | | | | 137/224 |
| 2,971,537 | A | * | 2/1961 | Kowalski | G05D 16/101 |
| | | | | | 137/636.1 |
| 3,469,446 | A | * | 9/1969 | Kochey, Jr. | G01F 1/363 |
| | | | | | 73/196 |
| 3,504,528 | A | * | 4/1970 | Trier | G01M 3/3263 |
| | | | | | 73/49.3 |
| 4,065,970 | A | * | 1/1978 | Wilner | G01L 9/0054 |
| | | | | | 338/4 |
| 4,095,934 | A | * | 6/1978 | Jensen | F23K 5/002 |
| | | | | | 431/202 |
| 4,953,388 | A | | 9/1990 | Barada | |
| 5,027,846 | A | * | 7/1991 | Baron | F16K 31/0606 |
| | | | | | 137/82 |
| 5,333,488 | A | * | 8/1994 | Ramsey | G01B 13/12 |
| | | | | | 73/1.61 |
| 5,540,082 | A | * | 7/1996 | Okuyama | B23Q 17/006 |
| | | | | | 340/815.45 |
| 7,437,911 | B2 | * | 10/2008 | Galburt | G01B 13/02 |
| | | | | | 73/37 |

(Continued)

*Primary Examiner* — Gregory J Toatley, Jr.
*Assistant Examiner* — Brandon J Becker
(74) *Attorney, Agent, or Firm* — Klarquist Sparkman, LLP

(57) ABSTRACT

The subject fluid gauges measure actual position of a workpiece relative to a target position. A gauge body that is positionable relative to the workpiece and that includes multiple differential-pressure (DP) sensors has a measurement channel and respective reference channels. Each DP sensor measures, over a respective individual dynamic pressure range, a differential pressure established by a respective fluid flow in the measurement channel relative to a fluid flow in a respective reference channel. The dynamic pressure ranges of the DP sensors substantially overlap each other. A controller is connected to and monitors the DP sensors. The controller is configured to select, for obtaining a differential pressure indicative of the position of the workpiece, a DP sensor sensing the smallest magnitude of DP.

25 Claims, 14 Drawing Sheets

(56) References Cited

U.S. PATENT DOCUMENTS

| | | | | |
|---|---|---|---|---|
| 2002/0046612 | A1* | 4/2002 | Mudd | G01F 1/40 |
| | | | | 73/861.52 |
| 2004/0118183 | A1* | 6/2004 | Gajdeczko | G01B 13/12 |
| | | | | 73/37.5 |
| 2005/0206055 | A1* | 9/2005 | Nemoto | F16F 13/10 |
| | | | | 267/140.11 |
| 2006/0012326 | A1* | 1/2006 | Iwashita | B30B 15/0094 |
| | | | | 318/645 |
| 2007/0186621 | A1* | 8/2007 | Kochersperger | G01B 13/12 |
| | | | | 73/37.5 |
| 2009/0233310 | A1* | 9/2009 | Ding | B01L 3/0275 |
| | | | | 435/7.1 |
| 2009/0314296 | A1* | 12/2009 | Cannon | A62B 7/14 |
| | | | | 128/205.25 |
| 2009/0316916 | A1* | 12/2009 | Haila | H04R 3/005 |
| | | | | 381/57 |
| 2010/0157274 | A1* | 6/2010 | Shibazaki | G03F 7/70341 |
| | | | | 355/72 |
| 2011/0157576 | A1* | 6/2011 | Sogard | G01B 13/00 |
| | | | | 355/72 |
| 2011/0227988 | A1* | 9/2011 | Yamazaki | B41J 29/393 |
| | | | | 347/19 |

* cited by examiner

FLUID GAUGES COMPRISING MULTIPLE DIFFERENTIAL PRESSURE SENSORS

CROSS-REFERENCE TO RELATED APPLICATION

This application claims priority to, and the benefit of, U.S. Provisional Application No. 61/592,924, filed on Jan. 31, 2012, which is incorporated herein by reference in its entirety.

FIELD

This disclosure pertains to, inter alia, fluid gauges (e.g., air gauges) for use in determining and/or monitoring position of a workpiece in a precision system such as, but not limited to, a system for microlithographically exposing a micro-pattern onto a substrate.

BACKGROUND

Various types of exposure systems are currently in use for imprinting micro-patterns onto the surfaces of substrates such as semiconductor wafers. A typical exposure system includes an illumination source, a first stage apparatus that holds and positions a pattern master (e.g., a reticle), a second stage apparatus (downstream of the first stage apparatus) that holds and positions the substrate, a projection-optical system situated between the first and second stage apparatus, and a control subsystem connected to and exercising operational control over these apparatus and subsystems. Since the sizes of the pattern elements are very small (now in the several tens of nanometers), the first and second stage apparatus must be capable, as controlled by the control subsystem, of achieving extremely accurate and precise positioning of the stage apparatus and projection-exposure system relative to each other so as to achieve corresponding accuracy of exposure.

Substantially all exposure systems currently in use employ various sensors, detectors, and other measurement devices for determining and monitoring the accuracy and precision of stage position and of many other operations performed by the exposure system. An example use of sensors and detectors is in devices for performing auto-focus of the imaging performed by the exposure system. Auto-focus involves accurate and precise placement of the reticle and wafer relative to the exposure-optical system so that exposures made on the wafer have a specified imaging resolution.

For use in auto-focus devices, fluid gauges have been considered for use, either alone or in cooperation with other devices such as slit-projection sensors as described in U.S. Pat. No. 4,650,983. A first conventional example of such a device, called an "air gauge," is discussed in U.S. Pat. No. 4,953,388, in which the device is configured as a pneumatic bridge. The gauge includes an air source, from which an air conduit is split to form a measurement arm and a reference arm. Each arm has a respective "probe" from which air is discharged onto a surface. For the measurement arm the surface is that of a workpiece. For the reference arm the surface is part of the gauge and is at a fixed distance from the probe. A mass-flow controller is connected between the arms to detect changes in air flow between the two arms resulting from a change in gap distance from the measurement probe to the workpiece. U.S. Pat. No. 5,540,082 discusses other conventional air gauges used for determining and monitoring position of a workpiece. Rather than using a mass-flow controller for determining differential flow of air to the two arms of the gauge, a differential pressure sensor is used. Also, the reference probe has been replaced with a controlled air-bleed device. Changes in gap distance are thus inferred from changes in the mass flow or pressure difference between the measurement and reference arms. These air gauges are sensitive to variations in ambient pressure and/or supply pressure, allowing these variations to introduce errors into wafer-height measurements. The magnitude of these errors tends to increase with corresponding increases in the dynamic pressure range in which the gauges operate.

Thus, conventional fluid gauges are sensitive to external influences that can degrade their operational accuracy and precision. Fluid gauges are also limited by available sensor technology. Sensors with larger dynamic range often suffer from lower resolution and increased electrical noise. Therefore, air gauges have been developed that employ multiple reference arms that can be selectively used with a measurement arm to increase the dynamic range of the fluid gauge. In this regard, reference is made to U.S. Patent Publication No. 2011/0157576, which is incorporated herein by reference to the maximum extent allowable by law. A fluid gauge as discussed in the '576 reference includes a gauge body having a measurement conduit and multiple reference conduits. The reference conduits have respective probes that are separated from respective reference surfaces by different respective reference gaps, across which the fluid is discharged. Alternatively, the reference probes can be replaced by controlled fluid-bleed devices. The measurement conduit has an outlet that is separated from the workpiece surface by a distance that is subject to change and that is determined by the gauge. A control system determines the position of the workpiece from the respective pressure differences between the measurement conduit and the reference conduits. (These pressure differences are termed respective "differential pressures.") The reference conduits and measurement conduit also include respective flow restrictors that are substantially identical. By utilizing multiple reference channels in parallel having different controlled fluid bleeds, the maximum magnitude of the differential pressure can be reduced compared to what otherwise would be obtained using one reference conduit, without limiting the dynamic range of the fluid gauge.

An example is shown in FIGS. 1A and 1B, wherein FIG. 1A is a schematic diagram of a fluid gauge having three reference "channels" and one measurement "channel." Each reference channel has a respective gap and thus a respective measurement pressure ("reference 1," "reference 2," and "reference 3"). The reference channels are arranged in parallel. Thus, associated with the measurement channel are three respective differential pressures ("$DP_1$," "$DP_2$," and "$DP_3$") that correlate to the respective references 1, 2, and 3. FIG. 1B depicts simulation data for a 2-mm diameter probe or "bearing" operating at a supply pressure of $2 \times 10^5$ Pa and a nominal gap of 20 μm. The -◇-◇-◇- plot is of differential pressure, and the -□-□-□- plot is of the estimated force ("load") applied by the probe against the substrate in the gap (wafer height) range of $-1.0 \times 10^4$ to $1.0 \times 10^4$ nm (denoted on the abscissa as −1.0E+04 to 1.0E+04 nm, respectively). Employing only one reference channel in this gauge would require that the reference arm cover a DP range of $-3 \times 10^4$ to $5 \times 10^4$ Pa (denoted on the ordinate as −3.0E+04 to 5.0E+04, respectively, and corresponding to a pressure (load) range of 0.005 to 0.05 N). By utilizing multiple reference channels in parallel, each with a different respective gap or controlled-bleed setting, each differential pressure $DP_1$, $DP_2$, $DP_3$, while utilized for determining height, covers approximately one-third the full dynamic pressure range. The specific values of $DP_1$, $DP_2$, $DP_3$ are monitored by a controller (not shown). Meanwhile, gaps or controlled bleeds are adjusted so that the pressure range in which differential pressure can be measured is divided by approximately three. FIG. 1B shows example $DP_1$, $DP_2$, $DP_3$ ranges of this example. Note that $DP_1$, $DP_2$, and $DP_3$ do not overlap each other. Consequently, only one DP signal lying within the dynamic range of the sensor can be obtained at a given moment in time. The controller monitors the three sensors continuously and selects the sensor lying within its dynamic range to determine the height.

Fluid gauges such as those discussed in the '576 application are not immune to the adverse effects of noise produced by the differential pressure sensors. This noise degrades the accuracy and precision of the position measurements produced by the fluid gauge; i.e., the noise introduces "gap error." Fluid gauges as discussed in the '576 application are also sensitive to variations in ambient pressure and/or variations in the supply pressure, which also contribute to gap error. As described below, gap error is substantially reduced by incorporating, in the fluid gauge, multiple reference channels with respective DP sensors, wherein the individual DP ranges covered by the reference DP sensors largely overlap each other. Also, by using a weighted average of the data produced by the DP sensors, a more accurate and precise height determination is made that is less sensitive to sensor noise than height measurements produced by conventional fluid gauges.

SUMMARY

Various embodiments of fluid gauges are provided for measuring actual position of a workpiece relative to a target position. Gauges representative of a first embodiment comprise a gauge body and a controller. The gauge body is positionable relative to the workpiece and includes multiple differential-pressure (DP) sensors comprising a measurement channel and respective reference channels. Each DP sensor measures, over a respective individual dynamic pressure range, a differential pressure established by a respective fluid flow in the measurement channel relative to a fluid flow in a respective reference channel, wherein the dynamic pressure ranges of the DP sensors substantially overlap each other. The controller is connected to and monitors the DP sensors. The controller is configured to determine respective position estimates based on the DP signals. The controller is also configured to determine an average of the position estimates, and to obtain from the average a measured position of the object. In many embodiments the measured position is the height of the object (e.g., position of the object in the z-direction.

The controller can be further configured to apply respective weighting coefficients to the estimates to obtain weighted estimates thereof. The weighting coefficients can be normalized and dependent upon respective DP values, wherein a sum of the weighting coefficients is at least unity. The weighted DP value can have any of various distributions, such as but not limited to, a Gaussian distribution. These embodiments provide gap measurements that are more accurate than obtained using prior-art fluid gauges. For example, the gap measurements have reduced sensitivity to variations in ambient pressure and/or fluid supply, and reduced sensitivity to sensor noise.

An advantageous configuration of the gauge body includes a measurement conduit and multiple reference conduits that conduct respective flows of fluid. The gauge body is positionable relative to a surface of the workpiece but separated from the surface of the workpiece by a measurement gap. The controller can be further configured to calculate a weighted average of respective DP signals produced by the DP sensors.

Gauges representable of a second embodiment comprise a fluid-measurement channel including a measurement pressure sensor, wherein the measurement channel conducts a flow of fluid into a gap between a surface of the workpiece and the measurement channel. The measurement pressure sensor produces a value of measurement pressure that is a function of a width of the gap. The embodiment also includes multiple fluid reference channels that conduct respective flows of the fluid. The reference channels include respective reference pressure sensors that produce respective values of reference pressure. A controller is connected to the reference pressure sensors and to the measurement pressure sensor, wherein the controller is configured to determine a respective differential pressure (DP) value from the measurement pressure relative to each reference pressure. The respective DP values are within respective dynamic pressure ranges that substantially overlap each other. The respective dynamic pressure ranges can include a respective at least one in which DP is closest to 0. In some embodiments the controller is configured (for determining the width of the gap) to select, for obtaining a differential pressure indicative of the position of the workpiece, a DP sensor recording the smallest magnitude of differential pressure.

A fluid gauge of the various embodiments summarized above can comprise at least two fluid reference channels that conduct respective flows of the fluid such that the first flow is greater than the second flow. In the following, fluid gauges having three reference channels will be used as an example. Each reference channel can comprise a respective reference conduit that conducts the fluid and delivers a respective flow of the fluid from the reference channel across a respective reference gap or through a controlled bleed device. Each reference channel can comprise a respective reference conduit including a respective variable gap or controlled bleed to produce a respective flow of the fluid from the reference channel.

Two basic embodiments described herein include a reference conduit that contains a flow restrictor, substantially identical to one in the measurement channel, and a controlled fluid-bleed device, or a flow restrictor and a probe exhausting into a fixed gap. The DP sensor is connected between the flow restrictor and the controlled bleed device, or probe, on the reference-channel side, and between the flow restrictor and the probe on the measurement-channel side.

Any of the fluid gauges summarized above can further comprise a fluid source that is connected to deliver respective flows of fluid into the measurement channel and reference channels.

Other embodiments are directed to fluid gauges that comprise a fluid measurement channel including a measurement pressure sensor. The measurement channel conducts a flow of fluid into a gap between a surface of the workpiece and the measurement channel, wherein the measurement pressure sensor produces a value of measurement pressure that is a function of a height of the gap. The fluid gauges include multiple fluid reference channels that conduct respective flows of the fluid. The reference channels include respective reference pressure sensors that produce respective values of reference pressure. The gauges also include a controller that is connected to the reference pressure sensors and to the measurement pressure sensor, wherein the controller is configured to determine a respective differential pressure (DP) value from the measurement pressure relative to each reference pressure. For determining the height of the gap, the controller is configured to reduce gap-height error by determining a height estimate, from the respective dynamic pressure ranges, that is an average of corresponding height estimates from the measurement pressure relative to each reference pressure. The respective DP values desirably are within respective dynamic pressure ranges that substantially overlap each other.

The average desirably is a weighted average, wherein the controller is configured to determine the weighted average from a sum of respective DP values each multiplied by a respective weighting factor. Each weighting factor can incorporate a distribution of DP; the distribution can be, for example, a substantially Gaussian distribution.

This disclosure also includes embodiments of methods for determining height of a workpiece relative to a target position. An exemplary embodiment comprises positioning the workpiece relative to a fluid-gauge body that includes multiple differential-pressure (DP) sensors. Using the fluid-gauge body, respective pressure differences between a measurement channel and respective reference channels are measured. The measurement channel includes a fluid-discharge opening separated from a surface of the workpiece by a gap having a DP-sensitive gap height. Using the DP sensors, respective DP measurements are obtained that extend over respective individual dynamic pressure ranges. The DP measurements represent respective fluid flow in the measurement channel relative to fluid flows in the respective reference channels. The dynamic pressure ranges of the DP sensors substantially overlap each other. A DP sensor is selected with the smallest magnitude of DP. From pressure data produced by the selected DP sensor, a corresponding gap is determined. From the determined gap, height of the workpiece is determined.

Other method embodiments pertain to methods for determining height of a workpiece relative to a target position. In an exemplary embodiment, the workpiece is positioned relative to a fluid-gauge body that includes multiple differential-pressure (DP) sensors. Using the fluid-gauge body, respective pressure differences between a measurement channel and respective reference channels are measured. The measurement channel includes a fluid-discharge opening separated from a surface of the workpiece by a gap having a DP-sensitive gap height. Using the DP sensors, respective DP measurements are obtained that extend over respective individual dynamic pressure ranges. The DP measurements represent respective fluid flow in the measurement channel relative to fluid flows in the respective reference channels. The dynamic pressure ranges of the DP sensors substantially overlap each other. The DP measurements are combined into an average DP measurement. From the average DP measurement, a corresponding gap is determined. From the determined gap, height of the workpiece is determined. In some embodiments the DP measurements are combined into a weighted average of the DP measurements.

The foregoing and additional features and advantages of the invention will be more readily understood from the following detailed description, which proceeds with reference to the accompanying drawings.

DETAILED DESCRIPTION

Figure 1A:
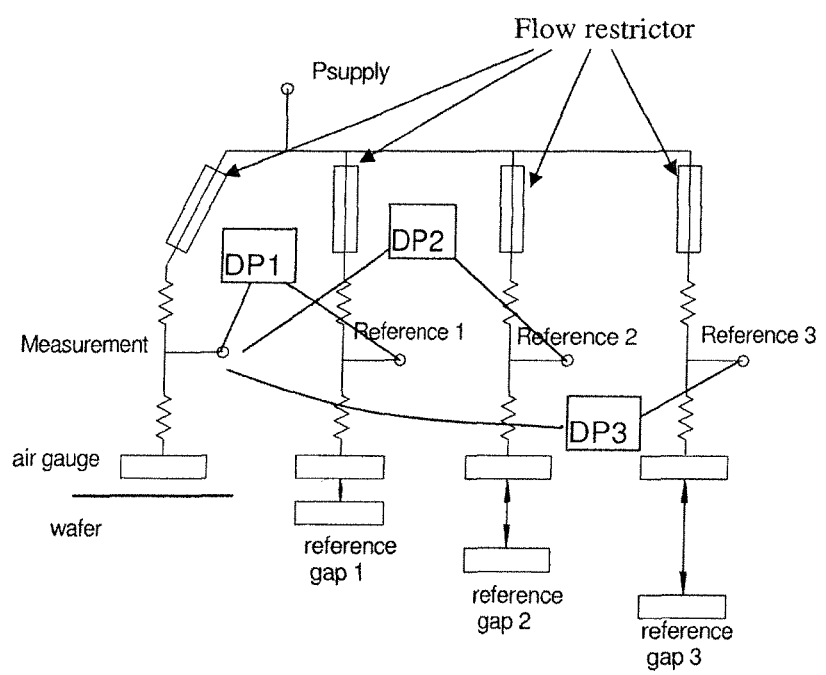
FIG. 1A is a schematic diagram of a prior-art fluid gauge having three reference "channels" and one measurement "channel," as discussed in U.S. Patent publication no. 2011/0157576.

This disclosure is set forth in the context of representative embodiments that are not intended to be limiting in any way.

The drawings are intended to illustrate the general manner of construction and are not necessarily to scale. In the detailed description and in the drawings themselves, specific illustrative examples are shown and described herein in detail. It will be understood, however, that the drawings and the detailed description are not intended to limit the invention to the particular forms disclosed, but are merely illustrative and intended to teach one of ordinary skill how to make and/or use the invention claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

This disclosure is directed toward all novel and non-obvious features and aspects of the various disclosed embodiments, alone and in various combinations and subcombinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Any mention herein of a controller or processor referred to in the singular will be understood to encompass use of multiple controllers or processors.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

If a figure includes an orientation system that includes an x-axis, a y-axis that is orthogonal to the x-axis, and a z-axis that is orthogonal to both the x- and y-axes, it should be noted that any of these axes can also be referred to as the first, second, and/or third axes.

In the embodiments described below, fluid gauges are provided that, compared to conventional fluid gauges (including conventional fluid gauges having multiple reference channels), are substantially less sensitive to noise and to variations in supply pressure and/or ambient pressure. These improvements are achieved by configuring the fluid gauges with multiple reference channels having their own respective reference pressure sensors, relative to which the fluid gauge can selectively obtain respective differential pressure (DP) measurements, and at least one measurement channel. Pairing of the measurement channel with a respective reference channel identifies a respective differential pressure ("DP") sensor. The DP sensors' respective dynamic pressure ranges substantially overlap each other, thereby providing multiple measurements of the differential pressures and thus multiple estimates of the measurement gap while at least one DP sensor remains at or near a balanced condition (i.e., $DP_i=0$). Alternatively or in addition, weighted averages of DP data from multiple DP sensors can be used to obtain gap measurements that are more accurate due to reduced sensitivity to variations in ambient pressure and/or fluid supply, and reduced sensitivity to sensor noise.

Figure 2A:
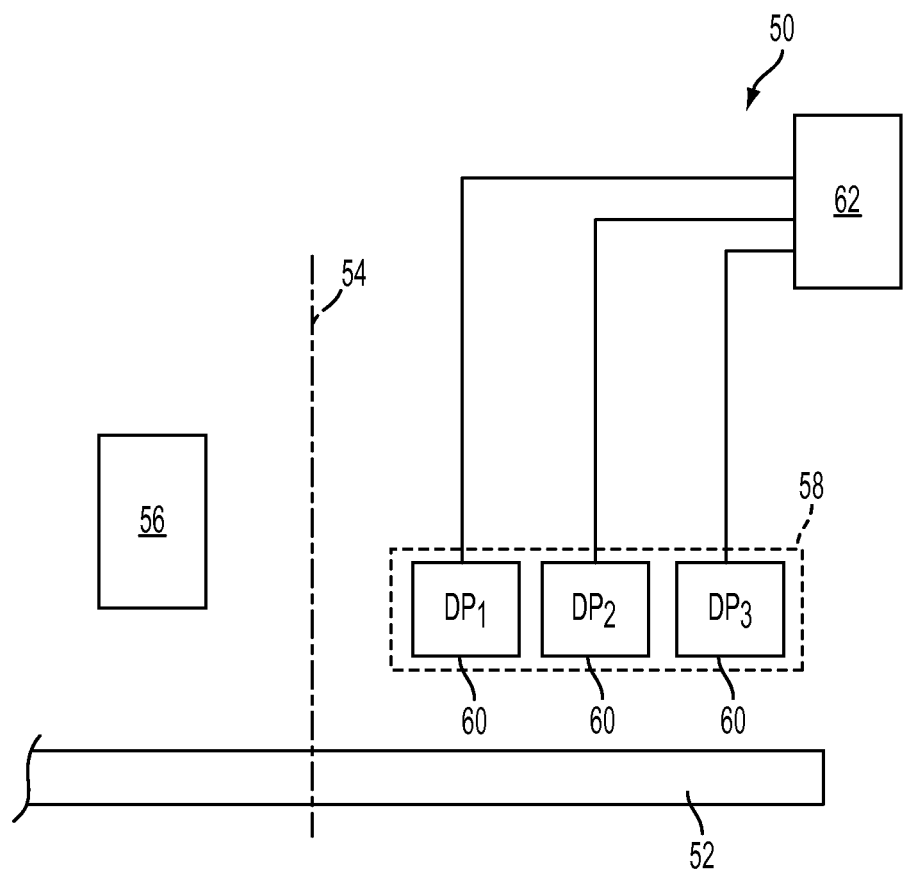
FIG. 2A is a schematic diagram of an embodiment of a fluid gauge comprising certain general features, including multiple differential-pressure (DP) sensors.

A general depiction of a fluid gauge 50 according to various embodiments is in FIG. 2A. The depicted fluid gauge 50 is useful for measuring the position of a workpiece 52 along an axis 54 relative to a structure 56, such as an exposure system, process tool, or the like. The fluid gauge 50 comprises a gauge body 58 that is positionable relative to the workpiece 52 and that includes multiple DP sensors 60 (three are shown). Each DP sensor 60 measures, over a respective individual dynamic pressure range, a respective differential pressure established by fluid flow in a measurement gap between the gauge 50 and the workpiece 52, relative to a respective reference pressure established by a corresponding fluid flow in a respective reference gap. The respective DP ranges of the DP sensors 60, used to estimate the change in the measurement gap, substantially overlap each other and can be smaller than corresponding dynamic ranges produced by fluid gauges having fewer DP sensors per measurement channel, under the same operating conditions. A controller 62 is connected to the DP sensors 60 to receive respective DP signals from them. The controller 62 is also configured to select, for reference purposes, a particular DP sensor 60 whose DP value is closest to zero. Although three reference channels are utilized in this embodiment, any number greater than one may be used.

Figure 2B:
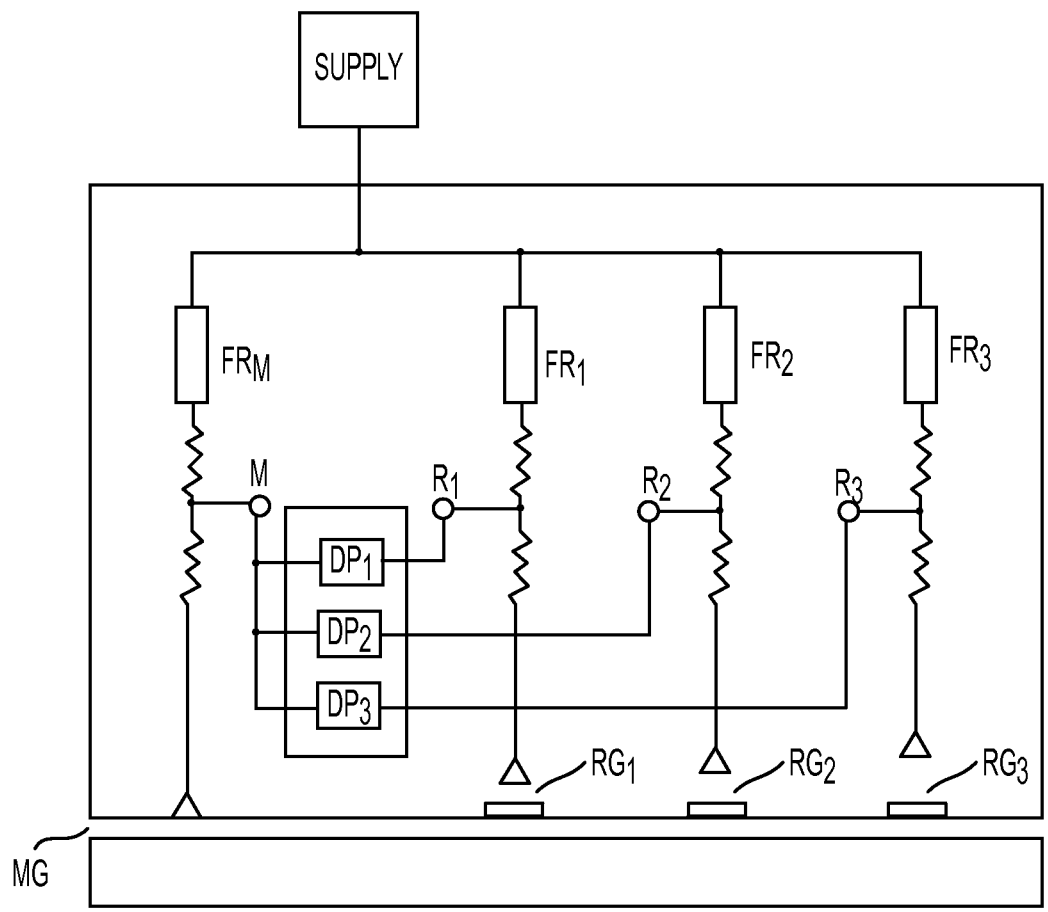
FIG. 2B is a schematic diagram of the embodiment of FIG. 2A, but including more detail than shown in FIG. 2A.

As shown more specifically in FIG. 2B, this embodiment utilizes one measurement channel M and three reference channels $R_1$, $R_2$, $R_3$ contained in a gauge body 58. Each reference channel has a respective gap $RG_1$, $RG_2$, $RG_3$ and thus a respective measurement pressure. The reference channels $R_1$, $R_2$, $R_3$ are arranged in parallel. Associated with the measurement channel M are a measurement gap MG and three respective differential pressures $DP_1$, $DP_2$, $DP_3$ that correlate to the respective reference channels $R_1$, $R_2$, and $R_3$. The differential pressures are utilized by the controller 62 as discussed above and elsewhere herein.

Figure 3:
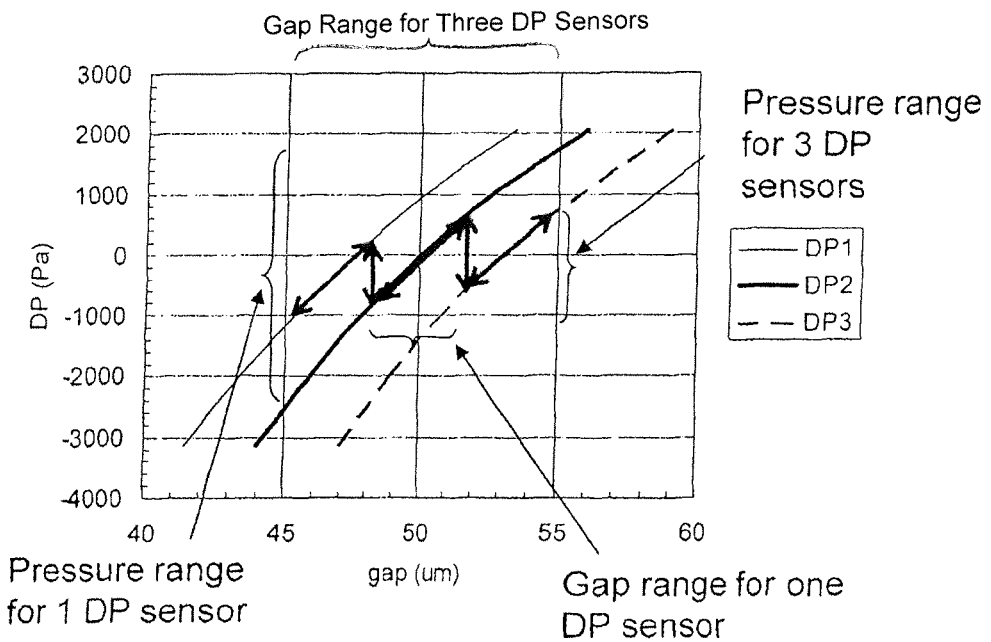
FIG. 3 is a plot of gap versus differential pressure for each of the respective DP sensors of an embodiment of a fluid gauge.

Example operating conditions for this embodiment are shown in FIG. 3. In a conventional air gauge, one DP sensor (e.g., producing differential pressure $DP_2$) would have to cover a differential-pressure range of approximately 4200 Pa for a gap ranging from 45-55 µm (nominally 50 µm; bold solid-line curve). In this embodiment, instead of employing only one DP sensor, three DP sensors are employed, which allows the range, used to estimate the change in the measurement gap, for each DP sensor to be correspondingly reduced while maintaining the substantial overlap of the three DP sensors.

Associated with each channel M, R1, R2, R3 in this embodiment are substantially identical flow restrictors $FR_M$, $FR_1$, $FR_2$, $FR_3$. Also, in this embodiment, the conduitry of each channel has respective intrinsic resistance as indicated by the sawtooth symbols. In this embodiment the flow restrictors are different from each other. For example, the flow restrictors have different structures and restrict the fluid in different flow amounts. In an alternative configuration the flow restrictors are respective adjustable flow restrictors, or at least one of the flow restrictors is identical to another of the flow restrictors. In other alternative configurations, one or more of the reference gaps $RG_1$, $RG_2$, $RG_3$ can be replaced with a respective controlled-bleed or adjustable flow restrictor. The gauge can be housed within a gauge body.

Reference is now made to FIG. 3 showing three differential-pressure curves $DP_1$, $DP_2$, $DP_3$ produced by an exemplary fluid gauge. Note that the differential-pressure curves have the same DP minima and the same DP maxima; hence, the curves substantially overlap each other. Meanwhile, the gap range covered by each sensor $DP_1$, $DP_2$, $DP_3$ is reduced by approximately three. E.g., the reduced gap range for sensor $DP_2$ is approximately 10/3=3.3 µm. Thus, the range of differential pressure measurements, used by each DP sensor to determine a measurement-gap change, is reduced by approximately 3, compared to a gauge having a single DP sensor. E.g., the pressure-measurement range of $DP_2$ is reduced by a factor of 3 from approximately 4200 Pa to approximately 1800 Pa. Note that sensor $DP_1$ can now be used for measurements of gaps ranging from 45 to 48 μm; sensor $DP_2$ can now be used for measurement of gaps ranging from 48 to 52 μm; and sensor $DP_3$ can now be used for measurement of gaps ranging from 52 to 55 μM. During use of the gauge, a particular DP sensor is selected that provides a respective DP measurement ($DP_i$) that is at or near a balanced condition ($DP_i$=0), which correspondingly reduces the sensitivity of the fluid gauge to changes in ambient pressure and/or supply pressure, compared to using one DP sensor. In FIG. 2B the reference gaps $RG_1$, $RG_2$, $RG_3$ which are different from each other, can be replaced with respective variable flow restrictors, each adjusted to provide a respective rate of fluid bleed.

Whenever an air gauge is in a "balanced" condition (where $DP_i \approx 0$), the gauge is substantially insensitive to changes in either or both the supply pressure and ambient pressure. I.e., atmospheric pressure and/or supply pressure may vary, but without imparting a significant change to the $DP_i$=0 condition. (This is closely analogous to the electrically balanced condition of a Wheatstone Bridge.) The insensitivity breaks down with increasing departure from the balanced condition, resulting in greater sensitivity of this fluid gauge to changes in supply pressure and/or ambient pressure. Hence, during operation of the fluid gauge, it is advantageous that the selected $DP_i$ be as small as possible. By using multiple reference channels arranged so that at least one (a selectable one) reference channel produces a small magnitude of DP ($DP_i \approx 0$), a selected channel can be used to provide a measurement of the gap that is less sensitive to changes in supply pressure or atmospheric pressure. This selection can be done alone or in combination with weighting (see later below) to favor that channel.

For small changes to supply pressure and/or to ambient pressure ($\delta_{Pa}$) and differential pressure (DP), the error in gap measurement ($\delta_{gap}$) is expressed by $\delta_{gap} \cong \alpha(\delta_{Pa})(DP)$, where the factor $\alpha$ depends on the pressure and flow conditions of the fluid gauge, and where the variable $\delta_{Pa}$ refers to atmospheric pressure changes or supply pressure changes. Again, if $DP \approx 0$, then the gap measurement produced by the gauge is substantially insensitive to changes in supply pressure and/or ambient pressure.

Figure 4:
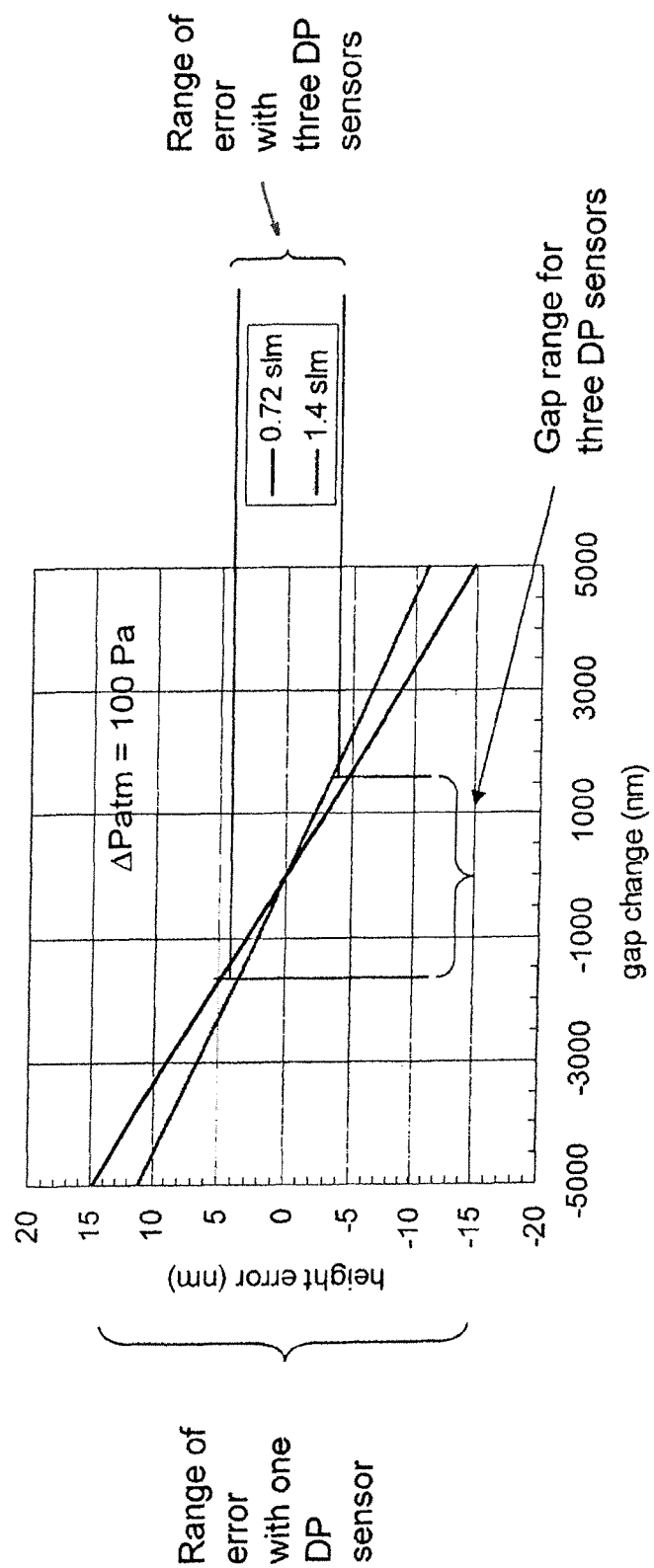
FIG. 4 is a plot of height error as function of gap change (nm) produced by a fluid gauge comprising only one DP sensor.

Dependence of air-gauge accuracy upon changes in ambient atmospheric pressure $P_{atm}$ can be estimated using a model from an air gauge environment-sensitivity evaluation, as well as flow data. Atmospheric pressure can change significantly day-to-day. For example, a $\Delta P_{atm}$ of 100 Pa from one day to the next is common and can be considerably larger. The corresponding gap-height error varies substantially linearly with corresponding changes in $P_{atm}$ and gap height relative to a gap in which $DP \approx 0$. See FIG. 4, which depicts a range of gap-height error when only one DP sensor is used (left-hand portion of the figure), compared to a range of error when three DP sensors are used (right-hand portion of the figure). Data are for two flow rates through the measurement channel of the gauge, namely 0.72 slm and 1.4 slm (wherein "slm" is an abbreviation of "standard liter per minute"). The graph in FIG. 4 depicts a change in gap range from −5000 to +5000 nm to approximately −1500 to +1500 nm, resulting from use of three DP sensors instead of only one to perform the gap measurement. Note that, while height error depends linearly on changes in $P_{atm}$ and height relative to gap where $DP \approx 0$, the plots pivot about the point at which zero gap change produces zero height error. In FIG. 4 the range of gap error obtained using three DP sensors is about −5 to +5 nm, compared to a range of error of about −15 to +15 nm using one DP sensor. Therefore, the range of error is reduced by using multiple DP sensors.

In view of the above, measuring a gap using this air gauge can include monitoring ambient pressure and supply pressure, and making appropriate corrections to the gap determinations using these pressure data. Calibration can be made to a particular atmospheric-pressure condition and gap, from which height determinations are then made. This approach in principle obviates the need for multiple reference channels. However, the use of multiple reference channels can reduce the contribution of sensor noise. Also, the correction provided by monitoring the atmospheric and supply pressures will be smaller and therefore less demanding of the relevant sensor accuracies.

For determination of gap, instead of (or in addition to) selecting the DP value closest to DP=0, the DP measurements can be combined together in a weighted average to reduce sensor noise while also minimizing sensitivity to changes in $P_{supply}$ or $P_{atm}$. For example, for three reference channels, there are three corresponding determined estimates of the gap ($h_i$), assuming substantial overlap:

$$h_1 = f_1(DP_1)$$

$$h_2 = f_2(DP_2)$$

$$h_3 = f_3(DP_3)$$

where ideally $h = h_1 = h_2 = h_3$. The estimates $h_i$ of height measurements are respective functions of the DP pressure; i.e., $h_i = f_i(DP_i)$. The functions $f_1$, $f_2$, and $f_3$ are not necessarily equal to each other.

Figure 1B:
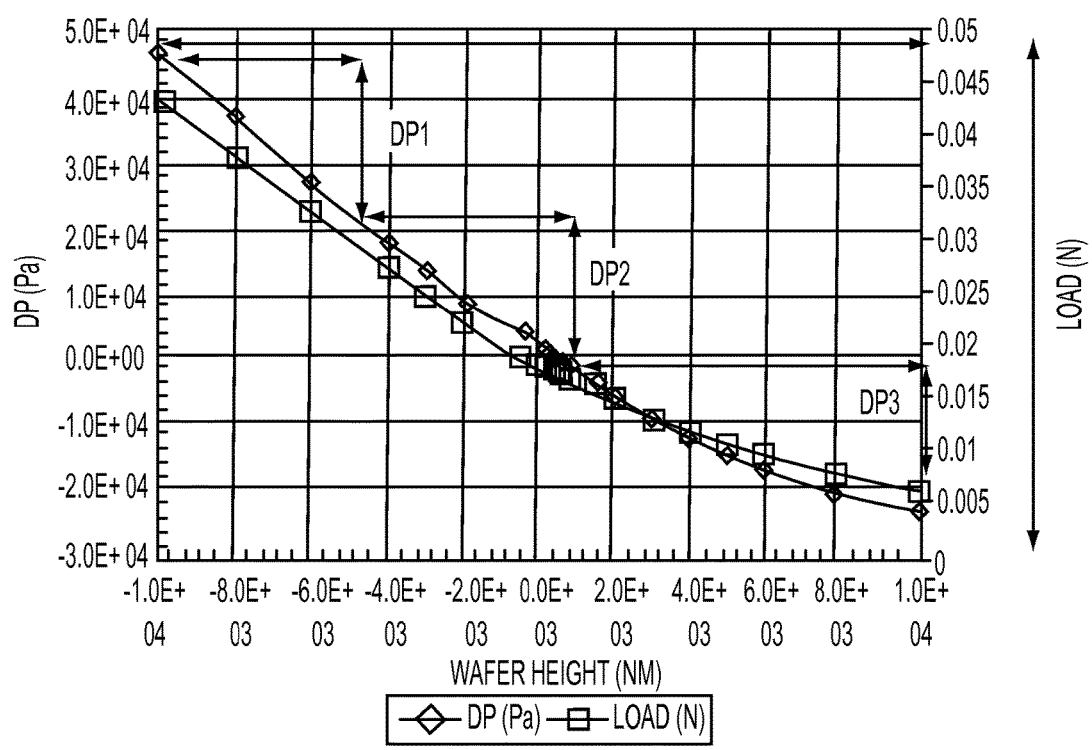
FIG. 1B is a plot of wafer height as a function of differential pressure, produced by a fluid gauge as discussed in U.S. Patent publication no. 2011/0157576.
Figure 5:
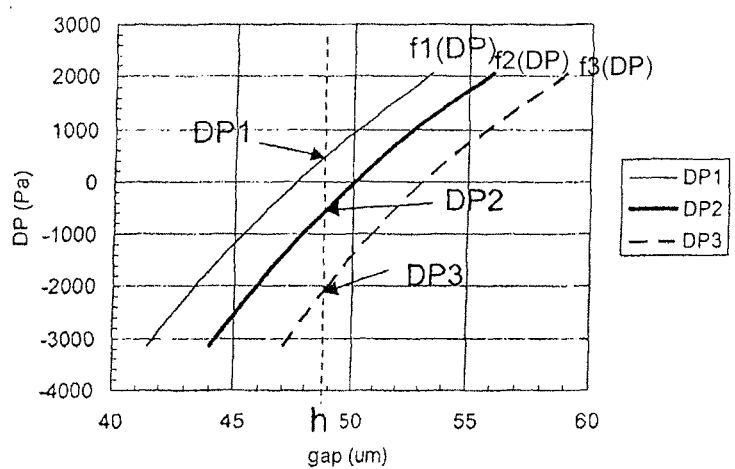
FIG. 5 is a plot of DP versus gap produced by an embodiment of a fluid gauge that includes three DP sensors.

A simple average of the three measurements:

$$h = (h_1 + h_2 + h_3)/3 = [f_1(DP_1) + f_2(DP_2) + f_3(DP_3)]/3$$

reduces sensor noise by a factor of $(\frac{1}{3})^{1/2}$, assuming they are uncorrelated (i.e., substantially random). See FIG. 5, in which the curves $f_1(DP_1)$, $f_2(DP_2)$, and $f_3(DP_3)$ have substantial overlap. Note, for example, the particular gap (approximately 49 μm) denoted by the vertical dashed line, and the three curves $f_1(DP_1)$, $f_2(DP_2)$, $f_3(DP_3)$ in substantial overlap relative to that gap. Compare to FIG. 1B, in which there is substantially no overlap.

The key here is to reduce sensitivity to changes in ambient pressure or supply pressure. Reducing sensitivity to sensor noise is a side advantage. This embodiment will, by its nature, improve both.

The noise referred to here is largely intrinsic noise produced by the DP sensors (e.g., intrinsic noise produced by DP sensors). Intrinsic noise can be produced at any time the sensors are receiving electrical power, even when they are not currently being used to measure pressure. This and/or any other noise introduces errors into gap measurements performed using the DP sensors.

Sensor noise is expected to be largely uncorrelated, so the above averaging should reduce its contribution to the measurement. In addition to sensor noise, acoustic noise within the measurement and reference channels can also degrade the height measurement. To the extent that acoustic noise within the reference channels is uncorrelated, the above averaging should reduce its effect on the height determination.

Whenever $DP \neq 0$, changes in $P_{supply}$ or $P_{atm}$ will introduce a gap error $\delta h = \alpha(\delta_{Pa})(DP)$. This leads to a total gap error (height error) of:

$$\Delta h = (\delta h_1 + \delta h_2 + \delta h_3)/3$$
$$= \alpha \delta_{Pa}[(DP_1 + DP_2 + DP_3)/3]$$

Figure 6:
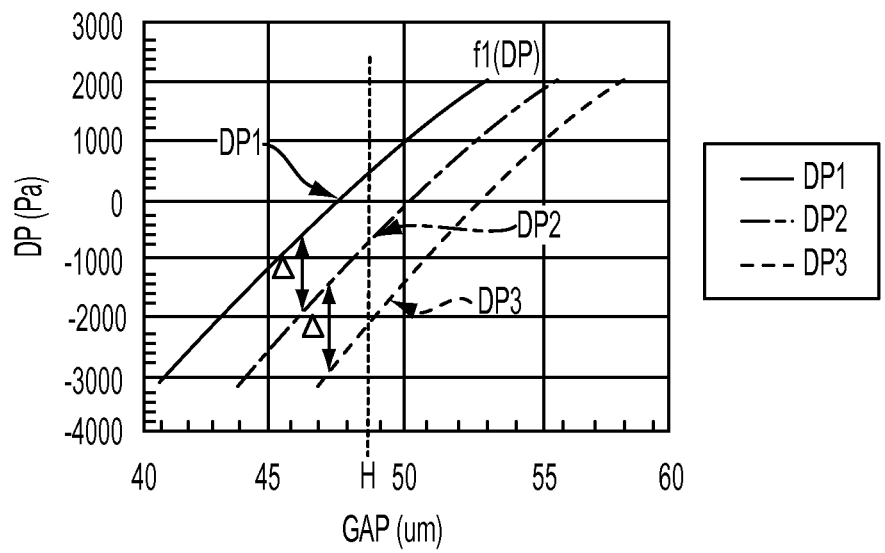
FIG. 6 is a plot of DP versus gap that is similar to FIG. 5 but also indicates A.

Thus, the height error $\Delta h$ depends upon the average of $DP_1$, $DP_2$, and $DP_3$. See FIG. 6. To a reasonable approximation, $DP_1 \approx DP_2 + \Delta$ and $DP_3 \approx DP_2 - \Delta$, so the height error is approximately:

$$\Delta h \approx \alpha \delta_{Pa}[(DP_2 + \Delta + DP_2 + DP_2 - \Delta)/3]$$
$$= \alpha \delta_{Pa} DP_2.$$

This is the error that would exist with a single sensor, so simply averaging data from multiple sensors may not appreciably change the height error (although the effects of sensor noise are reduced). However, the gap error still increases with $DP_2$, so being able to select a sensor with the smallest magnitude of DP is still advantageous.

Figure 7:
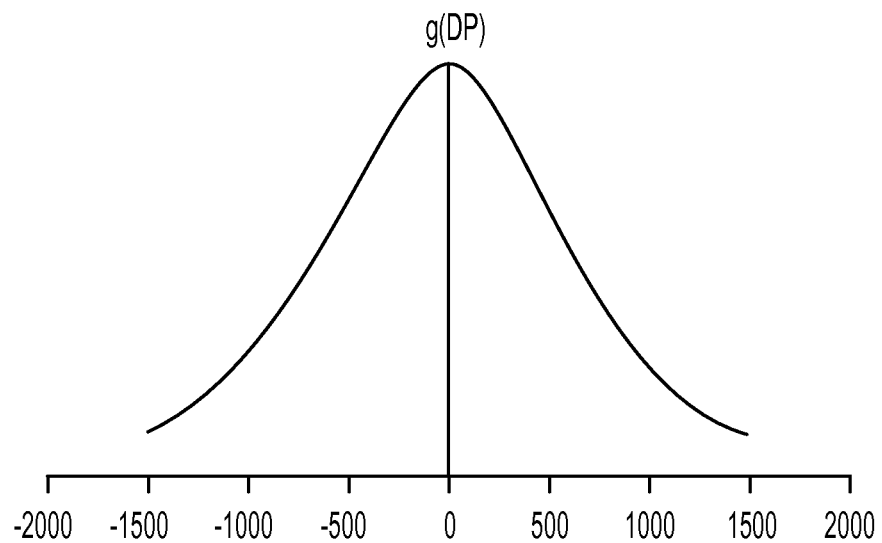
FIG. 7 is a plot of an exemplary Gaussian distribution of DP.

According to a more general algorithm, the gap can be defined by:

$$h=(w_1 h_1+w_2 h_2+w_3 h_3)=[w_1(DP_1)f_1(DP_1)+w_2(DP_2)f_2(DP_2)+w_3(DP_3)f_3(DP_3)],$$

where $w_1$, $w_2$, and $w_3$ are respective normalized weighting coefficients and depend on the values $DP_i$ and $w_1+w_2+w_3=1$. By way of example, $w_i(DP_i)$ can have a Gaussian distribution $g(DP_i)$, such as that shown in FIG. 7, or other distribution. For proper normalization with Gaussian distributions:

$$w_i(DP_i)=g(DP_i)/[g(DP_1)+g(DP_2)+g(DP_3)]$$

The weights will select out the values of DP that are closest to zero, which reduces height error. Although some increase in sensor noise may occur, compared to a simple average, the result is nevertheless better than the result obtained using a single sensor.

For example, consider a simple Gaussian for g(DP):

$$g(DP)=\exp[-(DP^2/2\sigma^2)].$$

Figure 8:
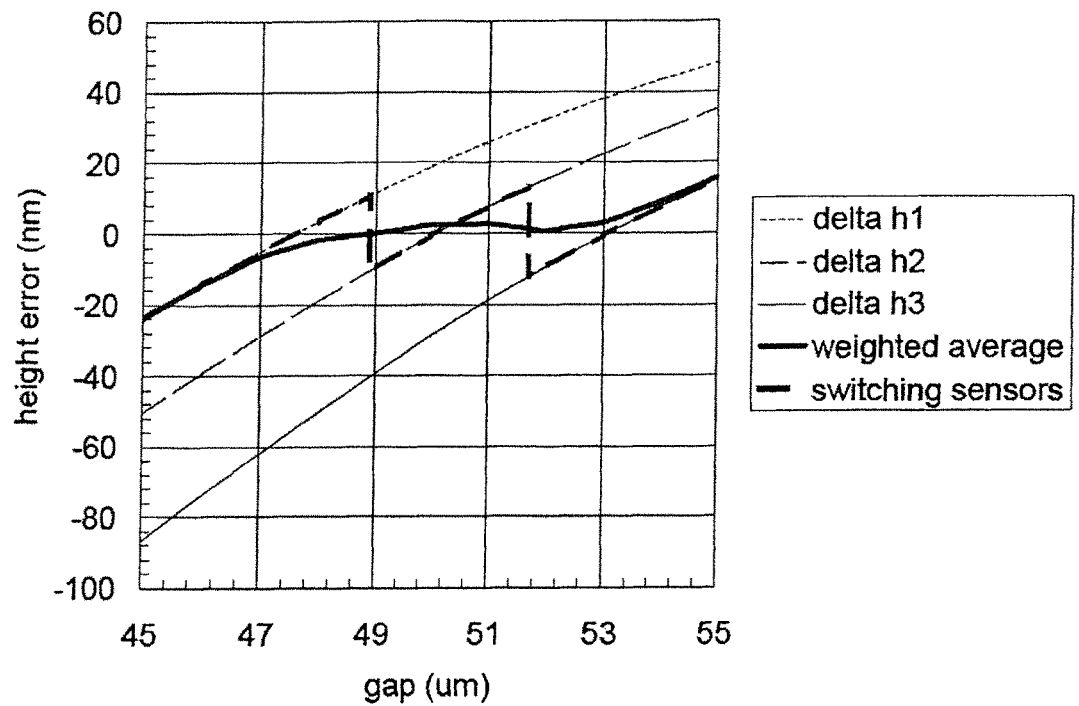
FIG. 8 is a plot of height error as a function of gap, including a plot of a simple average of the DP values produced by the DP sensors, and including a plot of height error when one simply switches from one DP sensor to another.

For the gap error, let $\alpha=(2\times10^{-4})$ nm/Pa$^2$; $\delta_{Pa}=100$ Pa; and $\sigma=600$ Pa. Using the DP curves shown in FIG. 6, the height errors from individual DP sensors, and the error obtained from the weighted average are shown in FIG. 8. FIG. 8 includes three curves $\delta_{h1}$, $\delta_{h2}$, and $\delta_{h3}$ ("delta h1," "delta h2," "delta h3," respectively) representing gap errors for three separate sensors. The light dashed-line curve is height error obtained by a single sensor but is also equal to a simple average of the three height errors. The sawtooth profile is similar to that shown in FIG. 1B, obtained by switching DP sensors as the gap changes. In contrast to any of the other profiles shown in FIG. 7, use of a weighted average height error (represented by the heavy line) with Gaussian weighting functions and the value of $\sigma$, above, provides a height error that is close to zero over most of the gap range (except at the extremes). Hence, use of the weighted average provides a height error that is substantially smaller than obtained using a single DP sensor, except at the extremes of the height range. It is noted that using additional DP sensors could extend the region in which the weighted average error is small. By making small adjustments to the g functions, the weighted average error can probably be made substantially zero over a range that is wider than the range shown in FIG. 6. In particular, selecting different values of $\sigma$ for the three sensors may improve the error over the entire height range. Additionally, each weighting coefficient could have a different functional form if desired.

Figure 9:
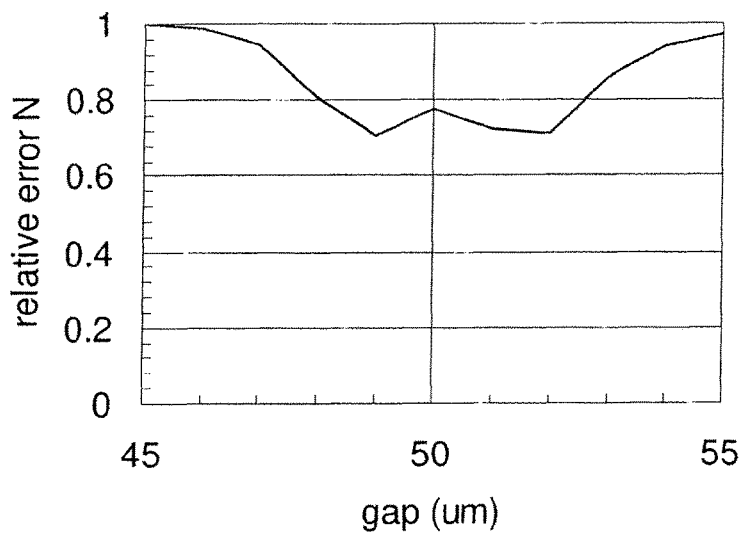
FIG. 9 is a plot of relative error as a function of gap produced by an embodiment of the fluid gauge, in which the plot is of a weighted average.

Assuming that the noise of the three sensors is uncorrelated, and of the same magnitude, the total noise from the weighted sum of the sensor signals is proportional to N, wherein $N \equiv (w_1^2+w_2^2+w_3^2)^{1/2}$. If the weights were equal (e.g., $w_1=w_2=w_3=\frac{1}{3}$, corresponding to a simple average), then $N=(\frac{1}{3})^{1/2}$, as shown previously. If only one sensor contributes significantly (e.g., $w_1=1$ and $w_2=w_3=0$), then $N=1$. The result (FIG. 9) shows that significant noise reduction is possible using multiple sensors, weighted to minimize gap error.

Figure 10A:
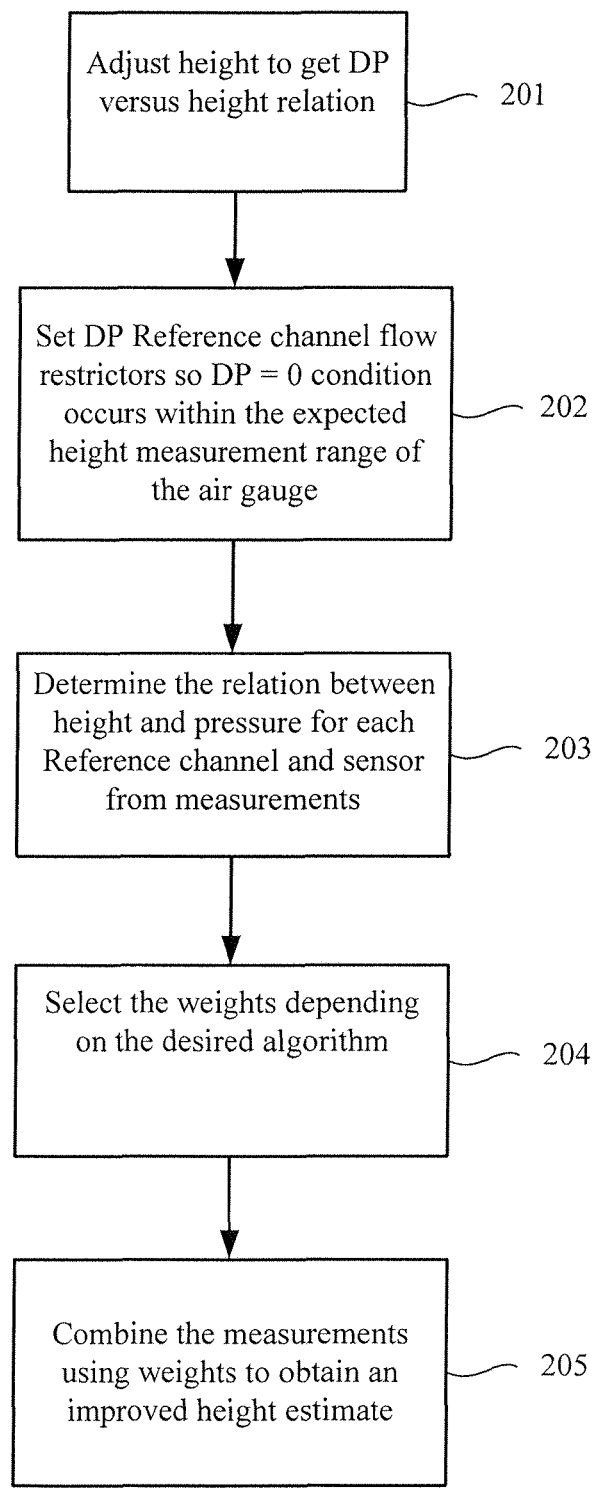
FIG. 10A is a flow-chart of an exemplary method for determining weighted-average coefficients.

As noted elsewhere herein, one or more controllers or processors are programmed to determine the differential pressures and to perform calculations involving the differential pressures as described above. A flow-chart of an exemplary protocol for selecting weighted-average coefficients, as performed by the controller(s), is shown in FIG. 10A. A flow-chart of a corresponding embodiment of the algorithm used by the controller(s) in determining weighted height is provided in FIG. 10B.

Figure 10B:
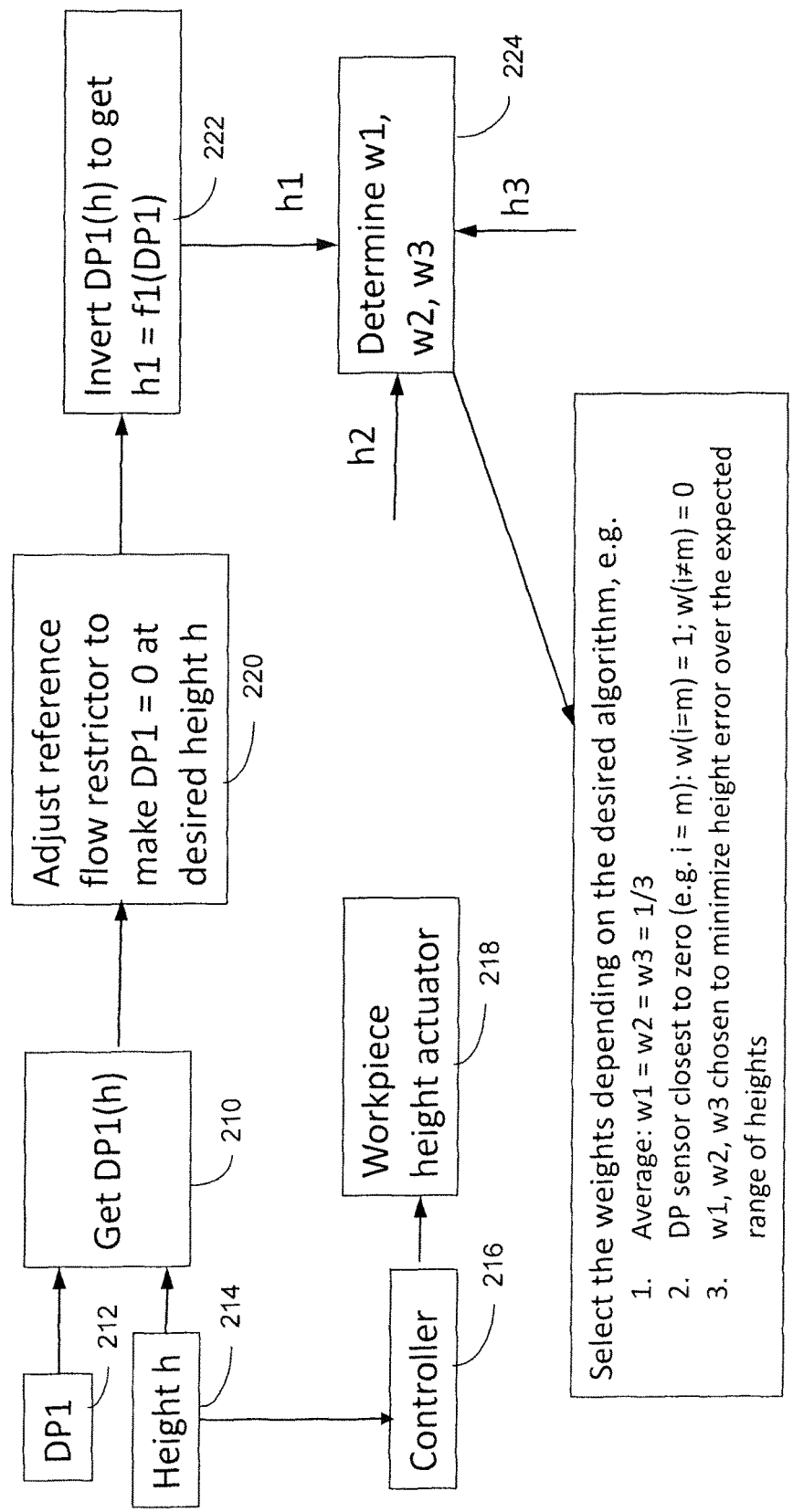
FIG. 10B is an algorithm diagram for the method shown in FIG. 10A.

The first two algorithms described in FIG. 10B are straightforward. The third algorithm is more complicated. The weights can be determined by trial and error to reduce the height error, or they may be determined more formally to reduce the error to a minimum value. For example, suppose the functional forms for the weights are identical and depend upon one parameter $\sigma$ Then:

$$W_i(DP_i)=w(\sigma,DP_i)=w(\sigma,DP_i(h))$$

The height error is then given by:

$$\Delta h=\alpha\delta_{Pa}[w(\sigma,DP_1(h))DP_1(h)+w(\sigma,DP_2(h))DP_2(h)+w(\sigma,DP_3(h))]$$

thereby representing the height error as a function of height h. The value of $\sigma$, which minimizes the height error over the range of height h, can then be determined using standard minimization techniques, such as, but not restricted to, least squares, Simplex, or Levenberg-Marquardt. These techniques can be extended to more general cases where $\sigma$ is different for each weight, or different functional forms are used.

FIG. 10A is a flow-chart of an exemplary method for determining weighted-average coefficients. In step 201, height is adjusted to obtain a relationship of DP versus height. In step 202, the DP reference-channel flow restrictors are set so that a DP=0 condition occurs within the expected height-measurement range of the gauge. For example, $DP_1$, $DP_2$, and $DP_3$ are set so that:

$DP_2=0$ at approximately the center of the height-measurement range;

$DP_1=0$ somewhere between the minimum height and the center of the height-measurement range; and $DP_3=0$ somewhere between the maximum height and the center of the height-measurement range.

As one example, if the height range is given by $h_0 \pm h$:

Adjust reference channel 1 so that $DP_1=0$ at a height of approximately $h_0-0.5h$;

Adjust reference channel 2 so that $DP_2=0$ at a height of approximately $h_0$; and Adjust reference channel 3 so that $DP_3=0$ at a height of approximately $h_0+0.5h$.

In step 203, a determination is made of the relation between height and pressure for each reference channel and sensor from measurements. For example:

$h_1=(DP_1)$–height estimate for channel 1

$h_2=f_2(DP_2)$–height estimate for channel 2

$h_3 = f_3(DP_3)$–height estimate for channel 3

In step 204, weights are selected. Referring to the example shown in FIG. 10B, $h_1$ is determined from $DP_1$ ($h_2$ and $h_3$ are determined similarly from $DP_2$ and $DP_3$, respectively). Respective weights $w_1$, $w_2$, $w_3$ are determined from $h_1$, $h_2$, $h_3$, respectively, according to a desired algorithm. Three exemplary algorithms are shown in FIG. 10B:

1. Determine average: $w_1 = w_2 = w_3 = \frac{1}{3}$
2. Set the DP sensor closest to zero (e.g., if i=m, then w(i=m)=1 and w(i≠m)=0)
3. Select $w_1$, $w_2$, and $w_3$ to minimize height error over the expected range of heights In step 205, the measurements are combined using the weights to obtain an improved height estimate:

$$h_{est} = w_1 h_1 + w_2 h_2 + w_3 h_3 = w_1 f_1(DP_1) + w_2 f_2(DP_2) + w_3 f_3(DP_3),$$

wherein $w_1$, $w_2$, and $w_3$ are functions of $DP_1$, $DP_2$, and $DP_3$, respectively.

Referring further to FIG. 10B, the depicted algorithms detail the calibration of $DP_1$, but the algorithms are extendable to $DP_2$ and $DP_3$. In block 210, the relation $DP_1(h)$ is determined based on a series of DP measurements $DP_1$ (212) and corresponding height measurements 214. The height measurements h are used by the controller(s) 216 for actuating, as required, a workpiece height actuator 218. Upon determining $DP_1(h)$, the reference flow restrictor is adjusted (220) to make $DP_1 = 0$ at a desired height h. In block 222, the relation $DP_1(h)$ is inverted to get $h_1 = f_1(DP_1)$, from which the corresponding weight $w_1$ is determined (224). The weights $w_2$ and $w_3$ are determined in a similar manner, based on corresponding determinations of $h_2$ and $h_3$.

Figure 10C:
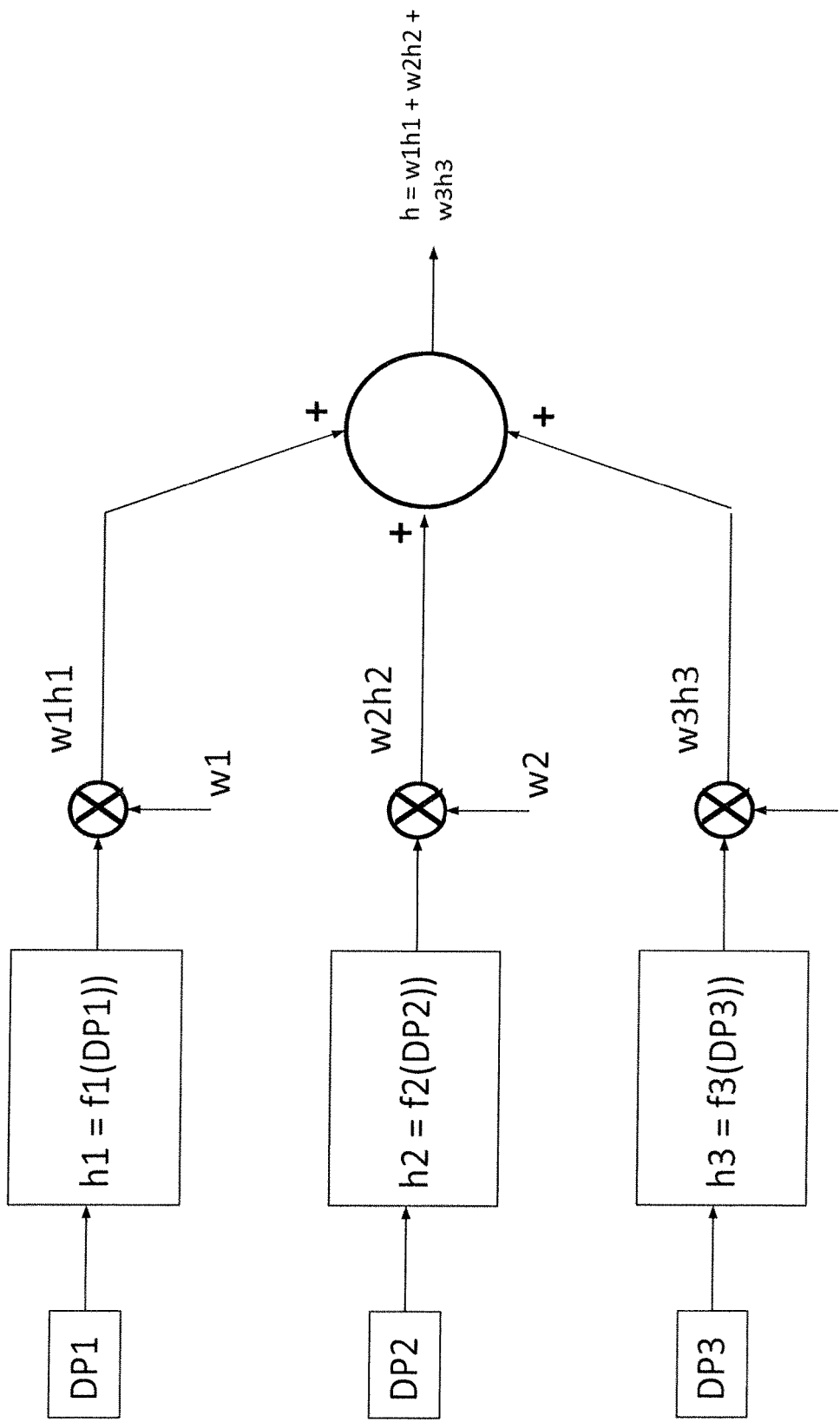
FIG. 10C is a flow-chart outlining a determination of height of a workpiece.

FIG. 10C is a diagram showing an embodiment of a method for determining height of a workpiece from three DP values, namely $DP_1$, $DP_2$, and $DP_3$. From these DP values, unweighted heights $h_1 = f_1(DP_1)$, $h_2 f_2(DP_2)$, and $h_3 = f_3(DP_3)$ are determined. Respective weights $w_1$, $w_2$, $w_3$ are added to each height, and the weighted heights are summed to yield $h = w_1 h_1 + w_2 h_2 + w_3 h_3$. Again, $w_1$, $w_2$, $w_3$ are selected to reduce height error over the expected range of heights, using one of the algorithms shown previously.

Included in this disclosure are any of various precision systems comprising a stage or the like that holds a workpiece or other item useful in a manufacture, relative to an axis, and that determines location of the stage at high accuracy and precision using devices and methods as described above. An example of a precision system is a microlithography system or exposure "tool" used for manufacturing semiconductor devices. A schematic depiction of an exemplary microlithography system 110, comprising features as described above, is provided in FIG. 11. The system 110 includes a system frame 112, an illumination system 114, an imaging-optical system 116, a reticle-stage assembly 118, a substrate-stage assembly 120, a positioning system 122, and a system-controller 124. The configuration of the components of the system 110 is particularly useful for transferring a pattern (not shown) of an integrated circuit from a reticle 126 onto a substrate 128 (e.g., a semiconductor wafer 128). The system 110 mounts to a mounting base 130, e.g., the ground, a base, or floor or other supporting structure. The system also includes a fluid-gauge measurement system 122A that measures the position of the substrate 128 (as an exemplary workpiece) along an axis (e.g., the z-axis or optical axis) with improved accuracy and precision. In certain embodiment the fluid-gauge measurement system 122A is configured so that environmental conditions near the workpiece and/or a photoresist-coated surface of the substrate 128 do not adversely influence the accuracy of the fluid gauge 122A.

Since the fluid-gauge measurement system 122A utilizes multiple references, the dynamic range of the fluid-gauge 122A is relatively large. Consequently, the substrate 128 can be positioned with improved accuracy, and the microlithography system 110 can be used to manufacture electronic devices having higher circuit densities.

There are various types of microlithographic systems. For example, the depicted system 110 can be used as a scanning type photolithography system. Alternatively, the exposure system 110 can be a step-and-repeat type microlithography system. However, the use of the exposure system 110 is not limited to a photolithography system for semiconductor manufacturing. The exposure system 110 can be used as, for example, an LCD photolithography system that exposes a liquid-crystal display device pattern onto a rectangular glass plate, or as a photolithography system for manufacturing thin-film magnetic heads.

The system frame 112 is rigid and supports the components of the exposure system 110. The system frame 112 shown in FIG. 10 supports the reticle-stage assembly 118, the optical assembly 116, the wafer-stage assembly 20, and the illumination system 114 above the mounting base 130.

The illumination system 114 includes an illumination source 132 and an illumination-optical assembly 134. The illumination source 132 emits a beam (irradiation) of light energy. The illumination-optical assembly 134 guides the beam of light energy from the illumination source 132 to the optical assembly 116. The illumination source 132 can be a mercury-lamp g-line source (436 nm), a mercury-lamp i-line source (365 nm), a KrF excimer laser (248 nm), an ArF excimer laser (193 nm), an $F_2$ laser (157 nm), an EUV source (13.5 nm), or an x-ray source. Alternatively, the illumination source 132 can generate a charged particle beam such as an electron beam.

The optical assembly 116 projects and/or focuses light leaving the reticle 126 to the substrate 128. Depending upon the configuration of the exposure system, the optical assembly 116 can magnify or reduce the image illuminated on the reticle 126.

Figure 11:
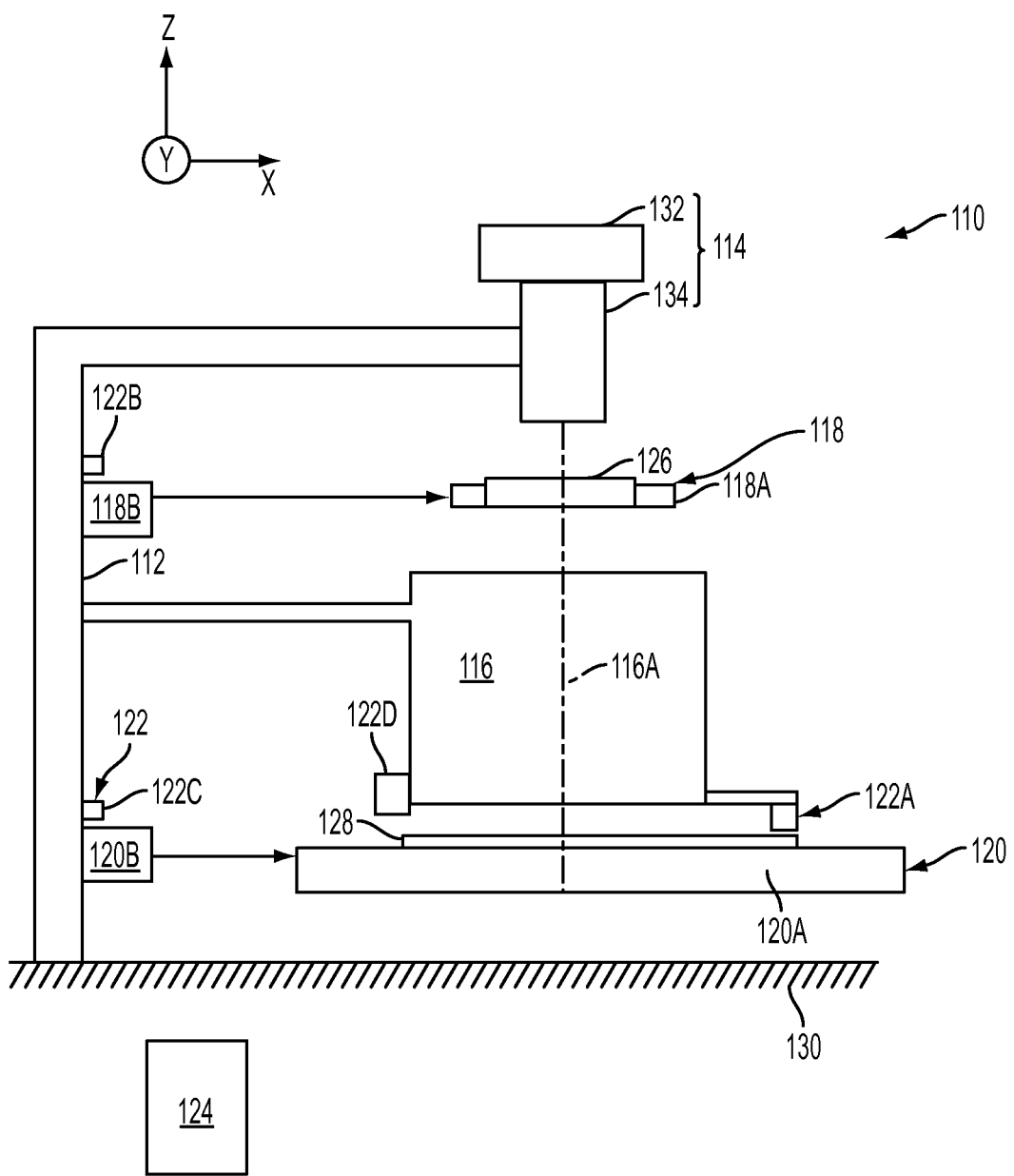
FIG. 11 is a schematic diagram of a microlithographic exposure system, as a representative precision system, including features of the invention described herein.

The reticle-stage assembly 118 holds and positions the reticle 126 relative to the optical assembly 116 and to the substrate 128. In FIG. 11 the reticle-stage assembly 118 includes a reticle stage 118A that retains the reticle 126, and a reticle-stage mover assembly 118B that positions the reticle stage 118A and the reticle 126. The reticle-stage mover assembly 118B can be configured to move the reticle 126 along the x-, y-, and z-axes, and about the x-, y-, and z-axes.

Somewhat similarly, the substrate-stage assembly 120 holds and positions the substrate 128 relative to the projected image of the illuminated portions of the reticle 126. In FIG. 11 the substrate-stage assembly 210 includes a substrate stage 120A that retains the substrate 128, and a substrate-stage mover assembly 120B that positions the substrate stage 120A and the substrate 128. The substrate-stage mover assembly can be configured to move the substrate 128 along the x-, y-, and/or z-axes, and about the x-, y-, and z-axes.

The positioning system 122 monitors movement of the reticle 126 and the substrate 128 relative to the optical assembly 116 or other reference. With this information the apparatus-control system 124 can control the reticle-stage assembly 118 to precisely position the reticle 126 and the substrate-stage assembly 120 to precisely position the substrate 128. For example, the positioning system 122 can utilize multiple laser interferometers, encoders, autofocus systems, and/or other measuring devices.

In FIG. 11 the positioning system 122 includes: (i) a reticle-measurement system 122B (that monitors the position of the reticle stage 118B and the reticle 126), (ii) a substrate-measurement system 122B that monitors the position of the substrate stage 120A along the x- and y-axes, and about the z-axis, and (iii) the fluid gauge 122A that monitors the position of the substrate 128 relative to the optical assembly 116 along an optical axis 116A (e.g., the z-axis).

Additionally, in certain embodiments the positioning system 122 can include an autofocus system 122D that monitors the position of the substrate 128 relative to the optical assembly 116 along the z-axis (the optical axis 116A), about the x-axis, and about the y-axis. A suitable autofocus system 122D is a slit-type system that directs multiple slit images of light at a glancing angle of incidence at the substrate 128 and measures the light reflected from the substrate 128. A further discussion of a slit-type autofocus system 122D is set forth in U.S. Pat. No. 4,650,983, which is incorporated herein by reference as far as permitted by law.

In one non-exclusive embodiment, a fluid gauge 122A is used in conjunction with an autofocus system 122D to calibrate the autofocus system 122D prior to processing (e.g., transferring images to) the substrate 128 to improve the accuracy of the autofocus system 122D.

The apparatus-control system 124 is connected to the reticle-stage assembly 118, the substrate-stage assembly 120, and the positioning system 122. The apparatus-control system 124 receives information from the positioning system 122 and controls the stage assemblies 118, 120 to precisely position the reticle 126 and the substrate 128. The apparatus-control system 124 can includes one or more processors and circuits.

Figure 12:
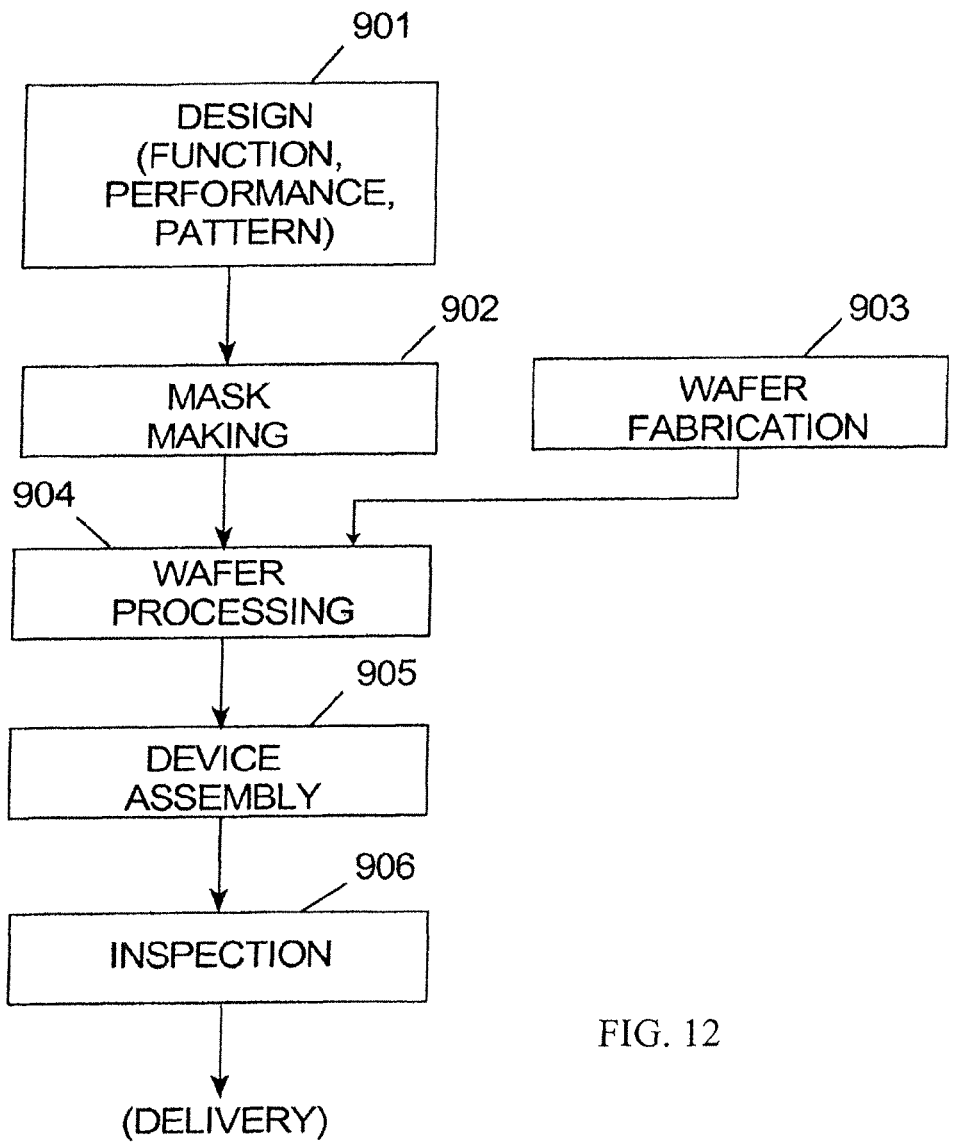
FIG. 12 is a flow-chart outlining a process for manufacturing a semiconductor device in accordance with the invention.

An exemplary process for manufacturing semiconductor devices, including an exposure step, is shown in FIG. 12. In step 901 the device's function and performance characteristics are designed. Next, in step 902, a mask (reticle) having a desired pattern is designed according to the previous designing step, and in a parallel step 903 a wafer is made from a suitable semiconductor material. The mask pattern designed in step 902 is exposed onto the wafer from step 903 in step 904 by a microlithography system described herein in accordance with the present invention. In step 905 the semiconductor device is assembled (including the dicing process, bonding process, and packaging process. Finally, the device is inspected in step 906.

Figure 13:
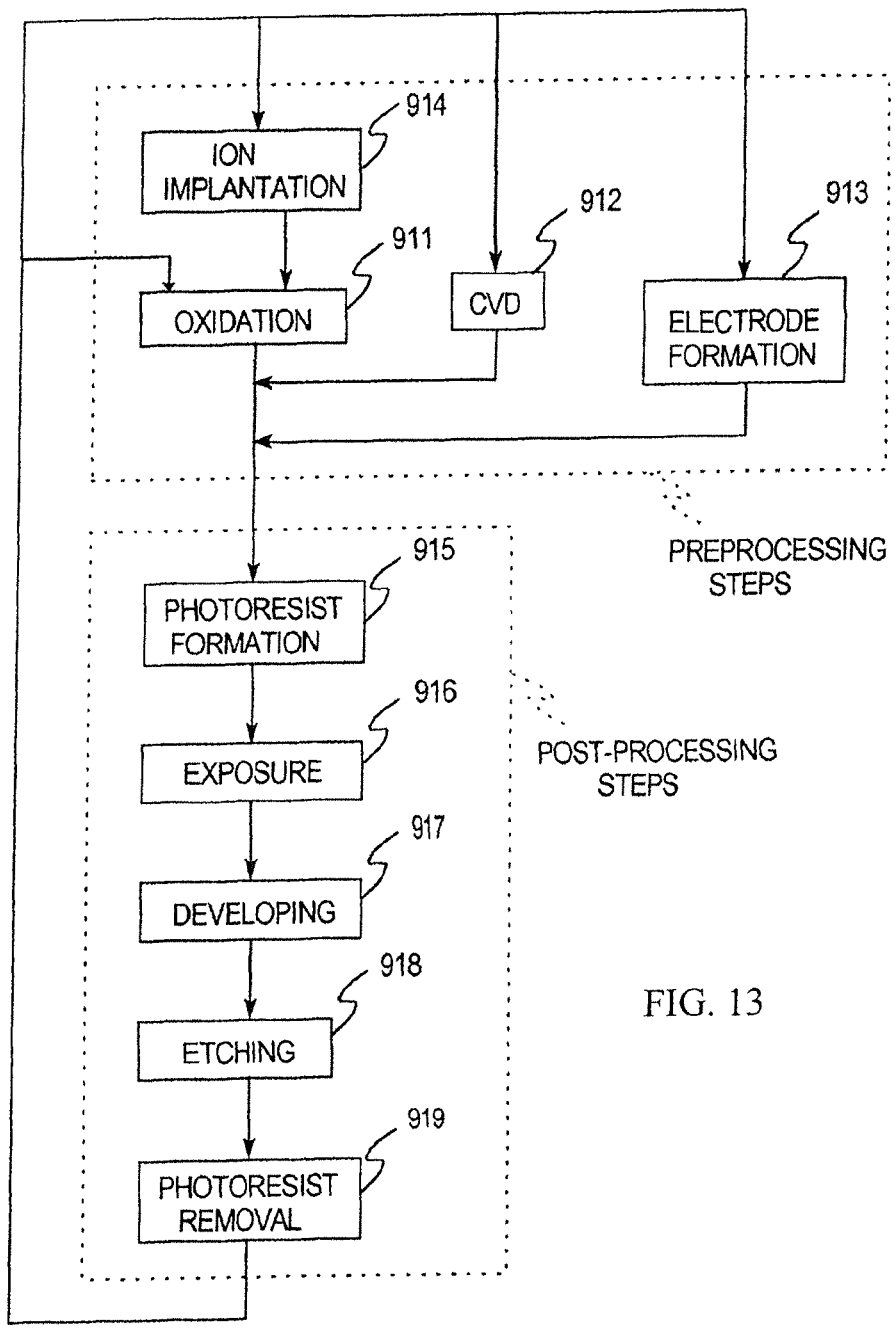
FIG. 13 is a flow-chart of a portion of a device-manufacturing process in more detail.

FIG. 13 is a flowchart of the above-mentioned step 904 in the case of fabricating semiconductor devices. In FIG. 13, in step 911(oxidation step), the wafer surface is oxidized. In step 912 (CVD step), an insulation film is formed on the wafer surface. In step 913 (electrode-formation step), electrodes are formed on the wafer by vapor deposition. In step 914 (ion-implantation step), ions are implanted in the wafer. The above-mentioned steps 911-914 constitute the preprocessing steps for wafers during wafer processing, and selection is made at each step according to processing requirements.

At each stage of wafer-processing, when the above-mentioned preprocessing steps have been completed, the following "post-processing" steps are implemented. During post-processing, first, in step 915 (photoresist-formation step), photoresist is applied to a wafer. Next, in step 916 (exposure step), the above-mentioned exposure device is used to transfer the circuit pattern of a mask (reticle) to a wafer. Then, in step 917 (developing step), the exposed wafer is developed, and in step 918 (etching step), parts other than residual photoresist (exposed material surface) are removed by etching. In step 919 (photoresist-removal step), unnecessary photoresist remaining after etching is removed. Multiple circuit patterns are formed by repetition of these pre-processing and post-processing steps.

It will be understood that gauges as disclosed herein are merely illustrative of the currently preferred embodiments, and that no limitations re intended to impact the details of construction or design herein shown, other than as described. In certain embodiments as described above, the fluid gauge is configured to monitor the position of a wafer or other lithographic workpiece relative to an optical assembly and used in conjunction with an auto-focus system that monitors position of a lithographic substrate relative to the optical assembly. However, use of the gauge is not limited to monitoring the position of a lithographic substrate. For example, the fluid gauge can be configured to monitor the position of a reticle relative to the optical assembly and used in conjunction with the auto-focus system that monitors the position of the reticle relative to the optical assembly.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A fluid gauge for measuring actual position of an object relative to a target position, comprising:
   a gauge body that is positionable relative to the object and that includes a measurement fluid passageway and multiple differential-pressure sensors which measure a difference between pressure of fluid in the measurement fluid passageway and pressure of fluid in a respective reference fluid passageways and which produce respective differential-pressure signals, the differential-pressure sensors measuring respective differential pressures established by respective fluid flows in the measurement fluid passageway relative to fluid flow in the respective reference fluid passageways having respective reference outlets situated at different gaps with respect to respective reference planes, each of the respective reference fluid passageways coupled to an associated flow restrictor, wherein each flow restrictor is associated with a different flow restriction and each of the respective reference fluid passageways are independent of each other; and
   a controller connected to and monitoring the differential-pressure sensors, the controller being configured to determine respective position estimates based on the differential-pressure signals, and to determine a measured position of the object based on determined weighted averages of the position estimates.

2. A fluid gauge for measuring an axial position of a workpiece, comprising:
   a fluid source coupled to supply a fluid;
   a measurement fluid passageway, one end of the measurement fluid passageway connected to the fluid source and another end of the measurement fluid passageway having a measurement outlet adjacent to the workpiece;
   a first reference fluid passageway, one end of the first reference fluid passageway connected to the fluid source and another end of the first reference fluid passageway having a first reference outlet situated at a first interval with respect to a first reference plane so that fluid from the fluid source flows to the first reference plane;

a second reference fluid passageway, independent of the first fluid passageway, one end of the second reference fluid passageway connected to the fluid source and another end of the second reference fluid passageway having a second reference outlet situated at a second interval which differs from the first interval with respect to a second reference plane so that fluid from the fluid source flows to the second reference plane;

a first differential-pressure sensor that detects a differential pressure between fluid passing through the measurement fluid passageway and fluid passing through the first reference fluid passageway;

a second differential-pressure sensor that detects a differential pressure between fluid passing through the measurement fluid passageway and fluid passing through the second reference fluid passageway; and a controller configured to determine the axial position of the workpiece by using at least one of a first output from the first differential-pressure sensor and a second output from the second differential-pressure sensor.

3. The fluid gauge of claim 2, wherein the controller is configured to select one of the first output and the second output.

4. The fluid gauge of claim 2, wherein the first differential-pressure sensor has a first differential-pressure measurement range and the second differential-pressure sensor has a second differential-pressure measurement range partially overlapping the first differential-pressure measurement range.

5. The fluid gauge of claim 3, wherein the first output from the first differential-pressure sensor has a first magnitude and the second output from the second differential-pressure sensor has a second magnitude, and the controller determines the axial position based on the smaller of the first magnitude and the second magnitude.

6. The fluid gauge of claim 3, wherein the controller is configured to determine the axial position by using either the first output from the first differential-pressure sensor or the second output from the second differential-pressure sensor, whichever is closest to zero.

7. The fluid gauge of claim 4, wherein the controller is configured to determine the axial position based on whichever of the first output from the first differential-pressure sensor or the second output from the second differential-pressure sensor is closer zero to reduce an axial position measurement error.

8. The fluid gauge of claim 3, wherein the controller is configured to determine the axial position based on whichever of the first output from the first differential-pressure sensor or the second output from the second differential-pressure sensor is closer to zero to reduce an axial position measurement error.

9. The fluid gauge of claim 2, wherein the measurement outlet is provided at gap with respect to the workpiece.

10. A fluid gauge for measuring axial position of a workpiece, comprising:

a fluid source coupled to supply a fluid;

a measurement fluid passageway, one end of the measurement fluid passageway connected to the fluid source, and another end of the measurement fluid passageway having a measurement outlet adjacent to the workpiece;

a first reference fluid passageway, one end of the first reference fluid passageway connected to the fluid source, and another end of the first reference fluid passageway connected to a first flow restrictor associated with a first flow restriction so that fluid flows from the fluid source to an output of the first flow restrictor;

a second reference fluid passageway, independent of the first fluid passageway, one end of the second reference fluid passageway connected to the fluid source, and another end of the second reference fluid passageway connected to a second flow restrictor associated with a second flow restriction that is different from the first flow restriction so that fluid flows from the fluid source to an output of the second flow restrictor;

a first differential-pressure sensor coupled to detect a differential pressure between the measurement fluid passageway and the first reference fluid passageway;

a second differential-pressure sensor coupled to detect a differential pressure between the measurement fluid passageway and the second reference fluid passageway; and a controller configured to determine an axial position of the workpiece based on at least one of a first output from the first differential-pressure sensor and a second output from the second differential-pressure sensor.

11. The fluid gauge of claim 10, wherein the controller is configured to select one of the first output and the second output.

12. The fluid gauge of claim 10, wherein the first differential-pressure sensor has a first differential-pressure measurement range and the second differential-pressure sensor has a second differential-pressure measurement range which partially overlaps the first differential-pressure measurement range.

13. The fluid gauge of claim 12, wherein the first output has a first magnitude and the second output has a second magnitude, and the controller is configured to determine the axial position based on the smaller of the first magnitude and the second magnitude.

14. The fluid gauge of claim 12, wherein the controller is configured to determine the axial position based on whichever of the first output or the second output is associated with a differential pressure value that is closer to zero.

15. The fluid gauge of claim 12, wherein the controller is configured to determine the axial position based on whichever of the first output and the second output is associated with a smaller absolute value of differential pressure to reduce an axial position measurement error.

16. The fluid gauge of claim 12, wherein the controller is configured to determine the axial position based on whichever of the first output and the second output is associated with a differential pressure value that is closer to zero to reduce an axial position measurement error.

17. The fluid gauge of claim 10, wherein the measurement outlet is situated at a measurement gap with respect to the workpiece.

18. An exposure apparatus which exposes a workpiece, comprising the fluid gauge of claim 2 situated to measure an axial position of the workpiece.

19. The exposure apparatus of claim 18, further comprising a projection optical system which projects a pattern on the workpiece, wherein a measurement axis coincides with an optical axis of the projection optical system.

20. An exposure method for exposing a workpiece, comprising measuring an axial position of the workpiece by using the fluid gauge of claim 2;

measuring an axial position of the workpiece by using an axial position measuring system; and calibrating the axial position measuring system by using an output from the fluid gauge.

21. A device manufacturing method, comprising:
exposing a pattern onto the workpiece by using the exposure method of claim 20;
developing the pattern which is transferred the workpiece;
forming a mask layer having a shape corresponding to the pattern; and
processing a surface of the workpiece through the mask layer.

22. An exposure apparatus which exposes a workpiece, comprising the fluid gauge of claim 10 situated to measure an axial position of the workpiece.

23. The exposure apparatus of claim 22, further comprising a projection optical system which projects a pattern on the workpiece, wherein a measurement axis coincides with an optical axis of the projection optical system.

24. An exposure method for exposing a workpiece, comprising
measuring the axial position of the workpiece by using the fluid gauge of claim 10;
measuring an axial position of the workpiece by using an axial position measuring system; and
calibrating the axial position measuring system by using an output from the fluid gauge.

25. A device manufacturing method, comprising:
exposing a pattern onto the workpiece by using the exposure method of claim 24;
developing the pattern which is transferred the workpiece;
forming a mask layer having a shape corresponding to the pattern; and
processing a surface of the workpiece through the mask layer.

* * * * *